June 24, 1941.  P. HEINISCH  2,247,295
CINEMATOGRAPHIC APPARATUS
Filed April 25, 1939  3 Sheets-Sheet 1
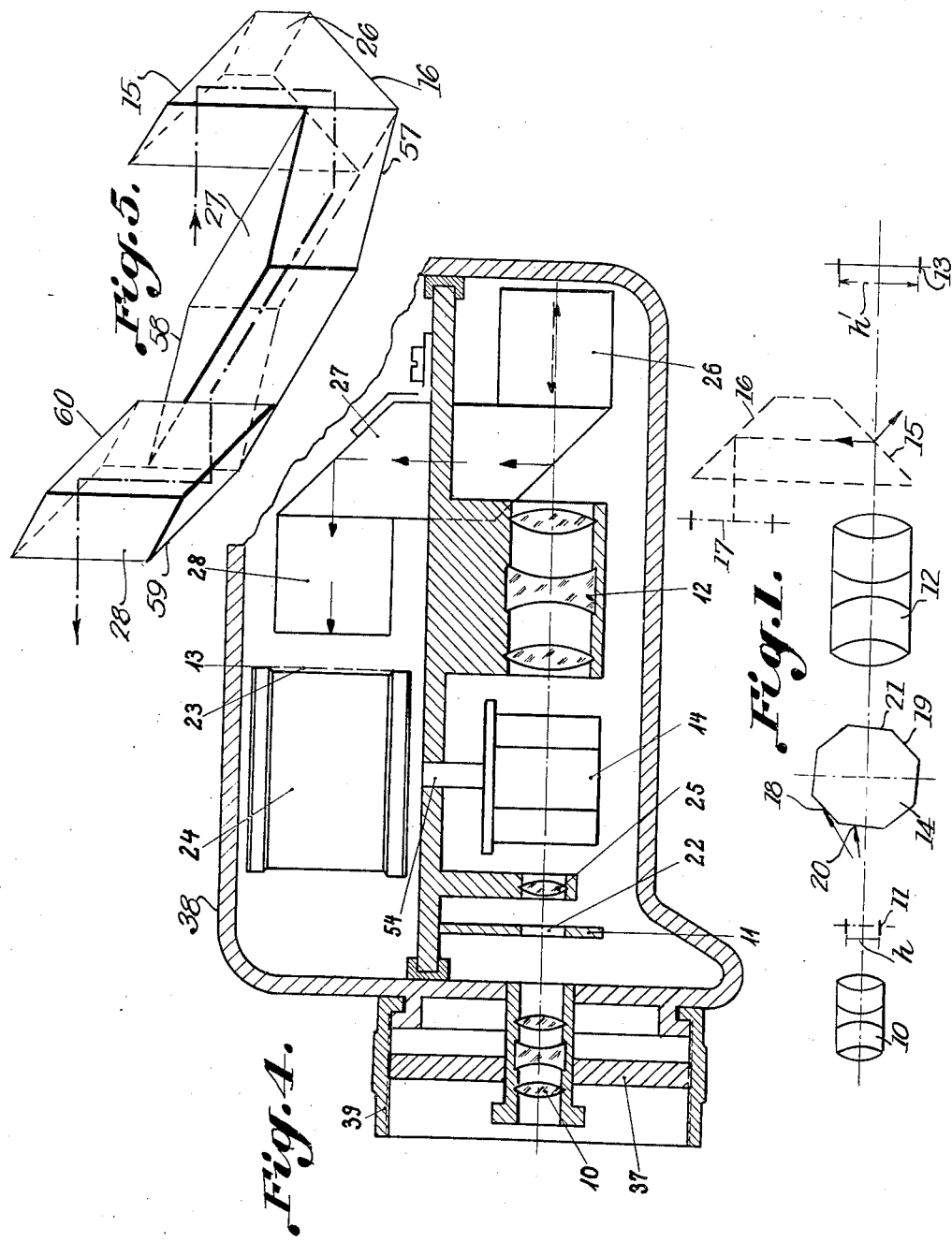
Inventor:
Paul Heinisch
By A. D. Adams
Attorney

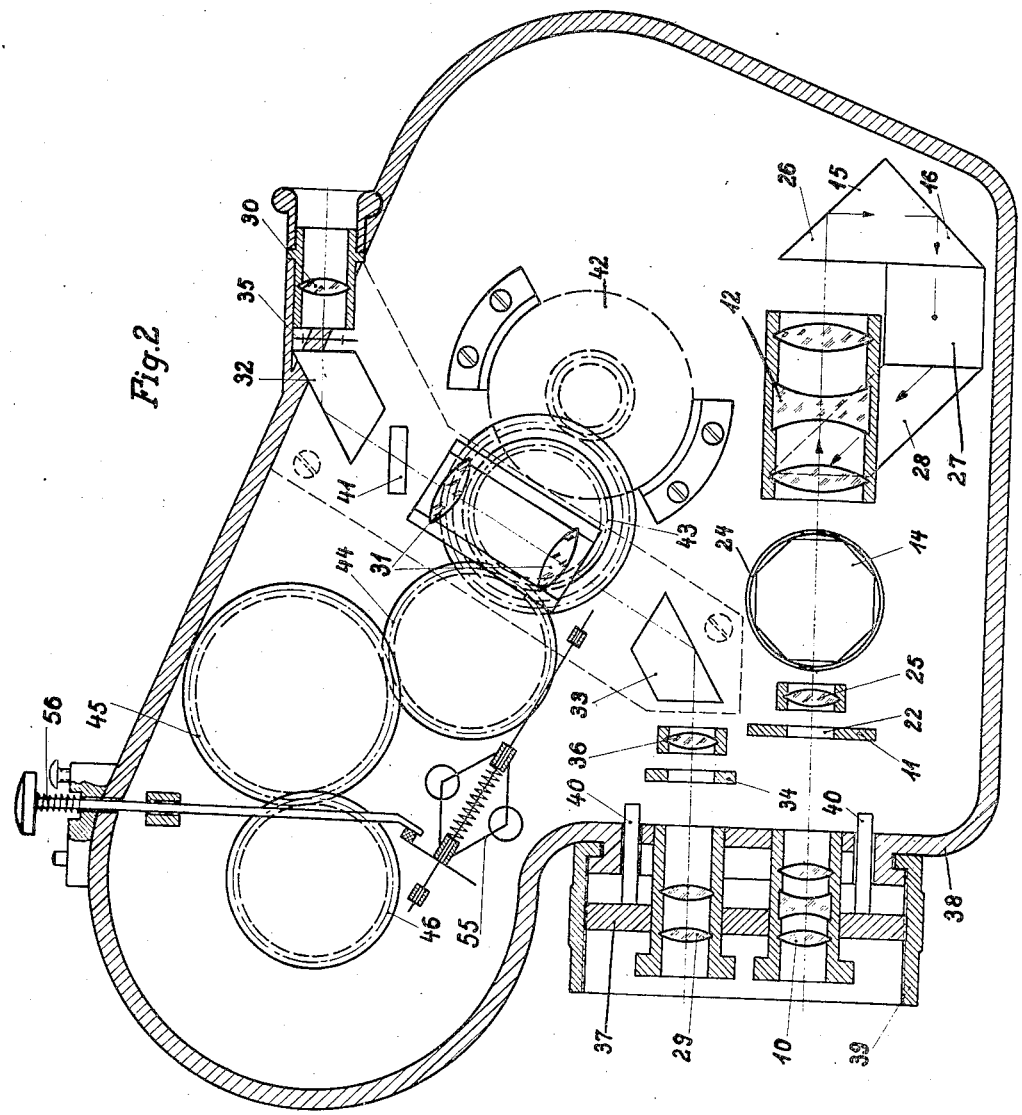

June 24, 1941.                    P. HEINISCH                    2,247,295
                          CINEMATOGRAPHIC APPARATUS
                          Filed April 25, 1939       3 Sheets-Sheet 3
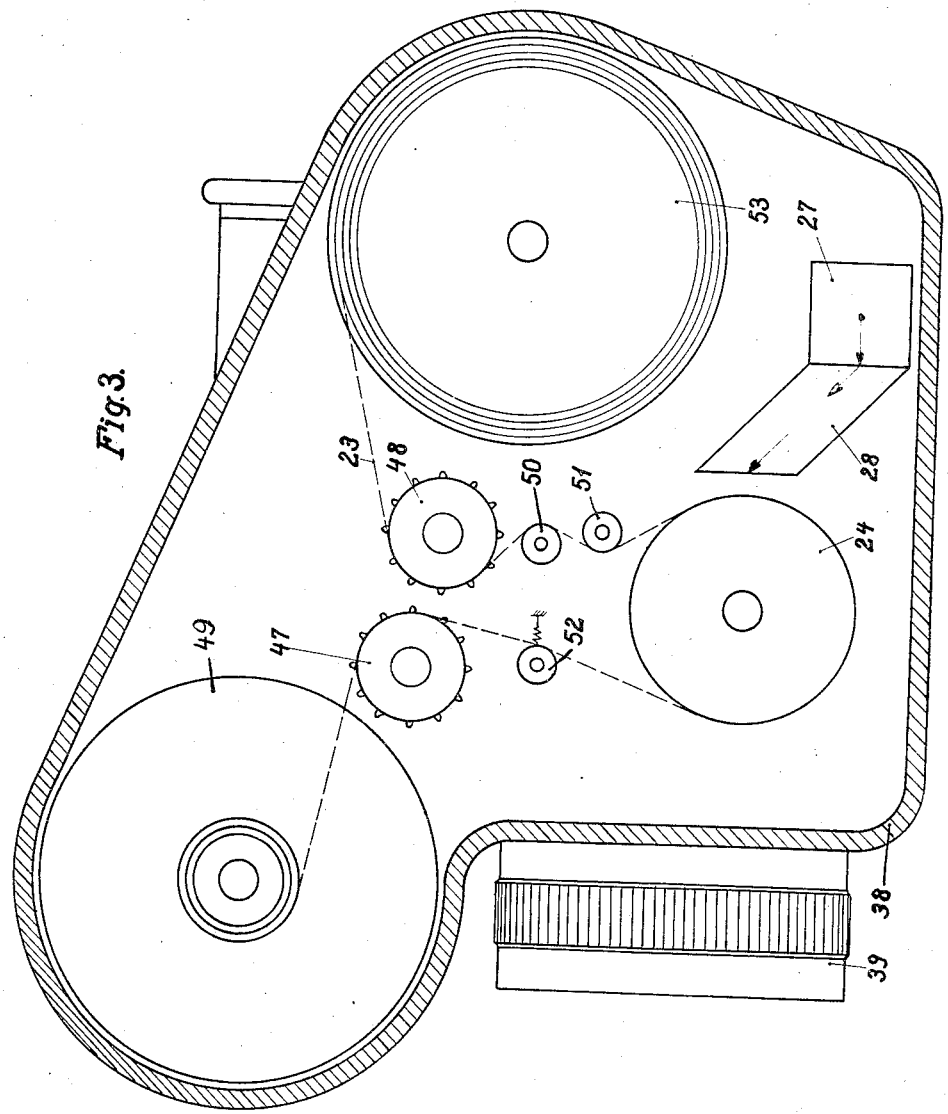
Inventor:
Paul Heinisch
By A. D. Adams
Attorney Patented June 24, 1941

2,247,295

UNITED STATES PATENT OFFICE 2,247,295

CINEMATOGRAPHIC APPARATUS

Paul Heinisch, Berlin-Zehlendorf, Germany, assignor to Askania-Werke A. G., a corporation of Germany Application April 25, 1939, Serial No. 269,995
In Germany April 28, 1938

4 Claims. (Cl. 88—16.8)

The invention relates to a cinematographic apparatus having means for the optical compensation of the travel of the image in the form of a continuously rotating prism having equal surfaces. The present invention especially relates to a cinematographic motion picture camera, operating according to this principle, for full picture size and high picture frequency.

Cinematographic apparatus with optical compensation of the travel of the image by way of a continuously rotating prism, with equal surfaces, and having an intermediate objective for producing a real image arranged between the film plane and the objective are well known. According to this principle, in the motion picture apparatus the objective for taking the image does not directly produce the image on the film, but an intermediate image is created, an image of which is produced on the film by means of an intermediate objective. In projectors the ray path is reversed correspondingly. In the cinematographic apparatuses of this type hitherto known the intermediate image produced by the first objective is of the same size as that produced by the second objective.

The invention is based on the perception that an adequate optical compensation of the travel of the image by means of continuously rotating prisms, having equal surfaces, is only achieved in case an adequate image displacement is already obtained at small angles of rotation. For the usual film image sizes one would have to use very large prism members for this purpose. However, one may avoid these disadvantages by the well-known arrangement of an intermediate image, if, according to the invention, the distance, converted as if in air, between the intermediate objective and the film plane is essentially greater than said distance between the objective and the intermediate image plane. In other words the intermediate image is made small as compared with the normal image in the film plane. According to the invention, only the travel of the small intermediate image needs to be compensated, which may be effected substantially free from error by means of a relatively small prism.

Other objects and advantages of the invention will appear from the following description when read in connection with the accompanying drawings, showing an embodiment of the invention, and its scope will be pointed out in the appended claims.

Referring to the drawings:

Fig. 1 is a schematic illustration of the ray path in a motion picture camera.

A cross sectional side elevation of an embodiment of a camera for operation by hand is shown in Figs. 2 and 3.

Fig. 4 is a cross sectional plan view of the camera.

Fig. 5 is a perspective view of an optical refracting system.

In Fig. 1 a small real image of the image height $h$ (intermediate image) is created in the plane 11 by the objective 10 having a short focussing range. An intermediate objective 12 produces the intermediate image magnified, i. e. in normal film size, in the film plane 13. The compensation prism 14 having equal surfaces and continuously rotating is provided between the two objectives 10 and 12. According to the invention, the travel of the small intermediate image 11 may be compensated without great errors, as the image height $h$ is small in relation to the size of the prism 14, whilst with a prism of equal size the travel of a normal film image having the height $h'$ could no longer be compensated without errors. The distance, converted as if in air, between the intermediate objective 12 and the film plane is therefore essentially greater than the distance, converted as if in air, between the objective and the intermediate image plane 11. The great distance (converted as if in air) between the compensating prism 14 and the film plane 13 may be advantageously utilized by inserting deflecting mirrors 15, 16 or prisms, so that the film plane, as indicated for instance at 17, may be arranged as near as possible to the film advancing drum which is mounted on the same shaft as the prism 14 and is continuously rotated together with said prism; here the embodiment according to Figs. 2-4 described in the following may be used. If at least one non-plated, totally reflecting surface 15 is provided for the deflection of the ray path, then the following advantage results. In the compensation of the travel of the image by the prism 14 it is always disturbing that in a certain position of the edges of the compensating prism 14 two surface pairs 18, 19 and 20, 21 are simultaneously effective. The double images thus produced do not quite coincide in case of an unsymmetrical position of the prism 14 so that undesirable and disturbing overlapping results. The image ray bundles, which penetrate the more inclined prism surface pair 18, 19 strike the non-plated, totally reflecting surface 15 of the deflection system more obliquely than the ray bundles penetrating the less inclined surface pair 20, 21 of the prism 14. As a result, the first, more oblique ray bundles are no longer totally reflected and are no longer effective on the film plane 17. Therefore, by means of the totally reflecting deflection surface 15 an automatic segregation and deflection of the disturbing additional images take place.

As already mentioned a practical embodiment of the inventive idea is illustrated in Figs. 2 to 4, i. e. a motion picture camera for normal film size to be operated by hand. The optical part of the camera is mounted as follows:

An objective 10 having a short focussing range produces in a first image plane as at 11, in which an image limitation 22 is arranged, a small, real image. A second objective 12 (intermediate objective) by deflection means produces on the film 23, from the image created in the first image plane 11 a further image on a magnified scale corresponding to the normal film image size. This second image plane 13, therefore, lies on the drum 24. The compensating prism 14, having equal surfaces and rotating continuously, is arranged between the two objectives 10 and 12, the film advancing drum 24 being mounted on the same shaft as said prism in such a manner that they both rotate uniformly. A collective lens is designated by 25. The deflection means, which deflect the image created by the objective 12 in the film plane 13, comprise 57, 58 and 59, 60 respectively a 45° prism 26 having the two totally reflecting surfaces 15 and 16, as well as two rhombic prisms 27 and 28 having each two reflecting surfaces. As shown in Fig. 5, the prism 26 has two totally reflecting surfaces 15 and 16 and the prism 28 two totally reflecting surfaces 59 and 60 with a rhombic prism 27 therebetween with two surfaces 57 and 58. As may be seen, the distance converted as if in air, between the objective 12 and the film image plane 13 is essentially greater than the distance between this objective and the first image plane 11. The optical equipment of the camera comprises further a finder telescope, comprising an objective 29, an ocular 30, deflection means 32, 33. An opaque glass plate 34 is arranged in the image plane of the objective 29 and a transparent support 35 for a frame-like limitation of the field of view in the image plane of the ocular. A collective lens is again designated by 36. In the ray path of the finder telescope a glass plate 41 is arranged, which may be displaced in dependence on the distance-adjustment of the objective 10 and by displacing the finder image the parallax of the height between the objective 10 and the objective 29 of the finder telescope is avoided. The two objectives 10 and 29 are mounted on a common support 37 and for the purpose of the adjustment of the sharpness may be jointly displaced lengthwise by means of a tube 39 turnably mounted at the camera casing 38, said tube by means of an inner thread cooperating with a support plate 37 supporting the objective and having an outer thread. The support plate 37 is guided in the camera casing by means of a bolt 40.

The film guiding and film actuating parts of the camera are mounted as follows:

A motor 42 uniformly actuates the film actuating drum 47, the film actuating drum 48 as well as the winding coil or drum 49 by means of a toothed gear 43, 44, 45, 46. The film advancing drum 24, which is constructed without teeth, is actuated by the film band 23. The drum 24 is, therefore, actuated by friction. Two guiding drums are designated by 50 and 51, and 53 is the film unwinding drum. As the prism 14 is mounted together with the film advancing drum 24 on a common shaft 54, the prism rotates exactly uniform with the drum 24. For adjusting the velocity or speed (change of the image number) a centrifugal regulator 55 cooperating with the tooth wheel 44 is provided, said regulator being controlled by a pressure knob 56 being outside of the camera.

Obviously, the present invention is not restricted to the particular embodiment herein shown and described. Moreover, it is not indispensable that all the features of this invention be used conjointly, since they may be employed advantageously in various combinations and sub-combinations.

What is claimed is:

1. Cinematographic apparatus having optical compensation comprising, in combination, a first objective producing a real image in a first image plane, a second objective arranged behind the image plane of the first objective and producing a real image in a second image plane of the image created in the first plane, a continuously actuated film advancing drum continuously moving the film through this second image plane, the distance converted as if in air, between the second objective and the second image plane being essentially greater than said distance between the second objective and the first image plane, a continuously rotating compensating prism, having equal surfaces, arranged between the first and the second objective, means for actuating the prism, the prism and the film advancing drum being arranged on a common shaft, and optical means arranged between the prism and the second image plane for deflecting the ray path.

2. Cinematographic apparatus having optical compensation comprising, in combination, a first objective producing a real image in a first image plane, a second objective arranged behind the image plane of the first objective and producing a real image in a second image plane of the image created in the first plane, a continuously actuated film advancing drum continuously moving the film through this second image plane, the distance converted as if in air, between the second objective and the second image plane being essentially greater than said distance between the second objective and the first image plane, a continuously rotating compensating prism, having equal surfaces, arranged between the first and the second objective, means for actuating the prism, the prism and the film advancing drum being arranged on a common shaft, and optical means arranged between the prism and the second image plane for deflecting the ray path, the optical deflecting means having at least one non-plated totally reflecting surface.

3. Cinematographic apparatus having optical compensation comprising, in combination, a first objective producing a real image in a first image plane, a second objective arranged behind the image plane of the first objective and producing a real image in a second image plane of the image created in the first plane, a continuously actuated film advancing drum continuously moving the film through this second image plane, the distance converted as if in air, between the second objective and the second image plane being essentially greater than said distance between the second objective and the first image plane, the second image plane lying on the film advancing drum, a compensating prism, having equal surfaces, continuously rotating, arranged between the first and the second objective, means for actuating the prism, the prism and the film advancing drum being arranged on a common shaft, and optical means arranged between the prism and the second film plane for deflecting the ray path.

4. Cinematographic apparatus having optical compensation comprising, in combination, a first objective producing a real image in a first image plane, a second objective arranged behind the image plane of the first objective and producing a real image in a second image plane of the image created in the first plane, a continuously actuated film advancing drum continuously moving the film through this second image plane, the distance converted as if in air, between the second objective and the second image plane being essentially greater than said distance between the second objective and the first image plane, the second image plane lying on the film advancing drum, a compensating prism, having equal surfaces, continuously rotating, arranged between the first and the second objective, means for actuating the prism, the prism and the film advancing drum being arranged on a common shaft, the film advancing drum having no teeth for advancing being actuated by means of friction of the film band, the film band being actuated by means of a toothed, actuated, smaller rewinding drum, drums for stretching the film band, and optical means arranged between the prism and the second image plane for deflecting the ray path.

PAUL HEINISCH.